(12) United States Patent
Purcell

(10) Patent No.: US 11,897,324 B2
(45) Date of Patent: Feb. 13, 2024

(54) DUAL RESERVOIR GAS TANK

(71) Applicant: Arctic Cat Inc., Thief River Falls, MN (US)

(72) Inventor: Lucas Grant Purcell, Grand Forks, ND (US)

(73) Assignee: Arctic Cat Inc., Thief River Falls, MN (US)

( * ) Notice: Subject to any disclaimer, the term of this patent is extended or adjusted under 35 U.S.C. 154(b) by 199 days.

(21) Appl. No.: 17/683,761

(22) Filed: Mar. 1, 2022

(65) Prior Publication Data

US 2023/0278418 A1 Sep. 7, 2023

(51) Int. Cl.
*B60K 15/03* (2006.01)

(52) U.S. Cl.
CPC .... *B60K 15/03* (2013.01); *B60K 2015/03138* (2013.01); *B60K 2015/03243* (2013.01)

(58) Field of Classification Search
CPC .......... B60K 15/03; B60K 2015/03138; B60K 2015/03243
See application file for complete search history.

(56) References Cited

U.S. PATENT DOCUMENTS

| 3,207,203 | A | | 9/1965 | Mack | |
|---|---|---|---|---|---|
| 4,178,955 | A | * | 12/1979 | Dau | B60K 15/077 137/264 |
| 4,241,578 | A | * | 12/1980 | Keene | F15B 1/26 137/593 |
| 4,354,521 | A | | 10/1982 | Harde | |
| 4,518,009 | A | * | 5/1985 | Schiemann | B60K 15/06 137/593 |
| 5,293,899 | A | | 3/1994 | Kwon | |
| 5,456,235 | A | | 10/1995 | Porter | |
| 6,002,328 | A | | 12/1999 | Wallrafen | |
| 9,517,692 | B2 | | 12/2016 | Tedman et al. | |
| 2012/0234616 | A1 | | 9/2012 | Jaskowiak et al. | |

FOREIGN PATENT DOCUMENTS

| DE | 102010021301 A1 * | 3/2011 | ............. B60K 15/03 |
|---|---|---|---|
| FR | 2468523 | 5/1981 | |
| WO | 99/14485 A1 | 3/1999 | |

* cited by examiner

*Primary Examiner* — Faye M Fleming
(74) *Attorney, Agent, or Firm* — Sandberg Phoenix & von Gontard

(57) ABSTRACT

A dual reservoir fuel tank, wherein the fuel tank comprises a main fuel reservoir having an inner wall and an outer wall that define a main reservoir chamber, and an auxiliary fuel reservoir connected to a bottom of the main fuel reservoir. The dual reservoir fuel tank additionally includes a fuel retention lip structured and operable to retain fuel within the auxiliary reservoir chamber when the dual reservoir fuel tank is disposed at an angle.

20 Claims, 11 Drawing Sheets

DUAL RESERVOIR GAS TANK

FIELD

The present teachings relate to gas tanks for light weight vehicles, particularly to a gas tank with an auxiliary reservoir structured and operable to provide fuel to the fuel pump when the vehicle and gas tank are disposed on a hill for extended periods of time.

BACKGROUND

The statements in this section merely provide background information related to the present disclosure and may not constitute prior art.

Liquid fuel powered (e.g., gasoline powered) power sport vehicles, off-road vehicles and other lightweight vehicles including, but limited to, snowmobiles, watercraft, all-terrain vehicles (ATVs), utility task vehicles (UTVs), recreational off-highway vehicles (ROVs), side-by-side vehicles (SSV), worksite vehicles, buggies, motorcycles, tactical vehicles, golf cars, personal transport vehicles, etc., generally include a liquid fuel powered engine (e.g., an internal combustion engine), a fuel tank that stores the fuel and a fuel pump that draws the fuel from the fuel tank and provides the fuel to the engine. Known fuel tanks and fuel pump systems are generally efficient and effective at providing fuel to the engine when the respective vehicle is traversing flat, level, or only slightly inclining/declining terrain. However, a common problem with known fuel tanks and fuel pump systems is that when the respective vehicle, and hence the fuel tank, is being driven over uneven and inclined/declined terrain that is at an angle of generally greater than 20° (e.g., terrain that is at angle of 20° to 75° from horizontal) the fuel in the fuel tank can flow to a portion of the tank where the fuel is not accessible to a fuel pump pick up, thereby starving the engine of fuel. This engine starvation scenario can also occur when a vehicle executes an extended sweeping turn.

SUMMARY

In various embodiments the present disclosure provides a dual reservoir fuel tank, wherein the fuel tank comprises a main fuel reservoir having an inner wall and an outer wall that define a main reservoir chamber, and an auxiliary fuel reservoir connected to a bottom of the main fuel reservoir. The dual reservoir fuel tank additionally includes a fuel retention lip structured and operable to retain fuel within the auxiliary reservoir chamber when the dual reservoir fuel tank is disposed at an angle.

In various other embodiments the present disclosure provides a dual reservoir fuel tank system that comprises a dual reservoir fuel tank and a fuel pump mounted to the dual reservoir fuel tank. The dual reservoir fuel tank comprises a main fuel reservoir comprising an inner wall and an outer wall that define a main reservoir chamber, and an auxiliary fuel reservoir connected to a bottom of the main fuel reservoir. The dual reservoir fuel tank additionally includes a fuel retention lip structured and operable to retain fuel within the auxiliary reservoir chamber and accessible to the fuel uptake sock when the dual reservoir fuel tank is disposed at an angle. The fuel pump comprises an outer body, a fuel pumping mechanism disposed within the outer body, and a fuel uptake sock disposed within the auxiliary fuel reservoir. The fuel retention lip is structured and operable to retain fuel within the auxiliary reservoir chamber and accessible to the fuel uptake sock when the dual reservoir fuel tank is disposed at an angle.

In yet other embodiments the present disclosure provides a vehicle that comprises a chassis, an engine that operates utilizing a liquid fuel and is mounted to chassis, a drivetrain that is operably connected to the engine, a vehicle propulsion system that is operably connected to the drivetrain, a vehicle steering system structured and operable to guide a direction in which the vehicle travels, and a dual reservoir fuel tank. In various embodiments the dual reservoir fuel tank comprises a main fuel reservoir having an inner wall and an outer wall that define a main reservoir chamber, and an auxiliary fuel reservoir connected to a bottom of the main fuel reservoir. An upper portion of the inner wall of the main fuel reservoir defines an open space in which a fuel pump can be disposed. The dual reservoir fuel tank additionally includes a fuel retention lip structured and operable to retain fuel within the auxiliary reservoir chamber when the dual reservoir fuel tank is disposed at an angle.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figure 7:
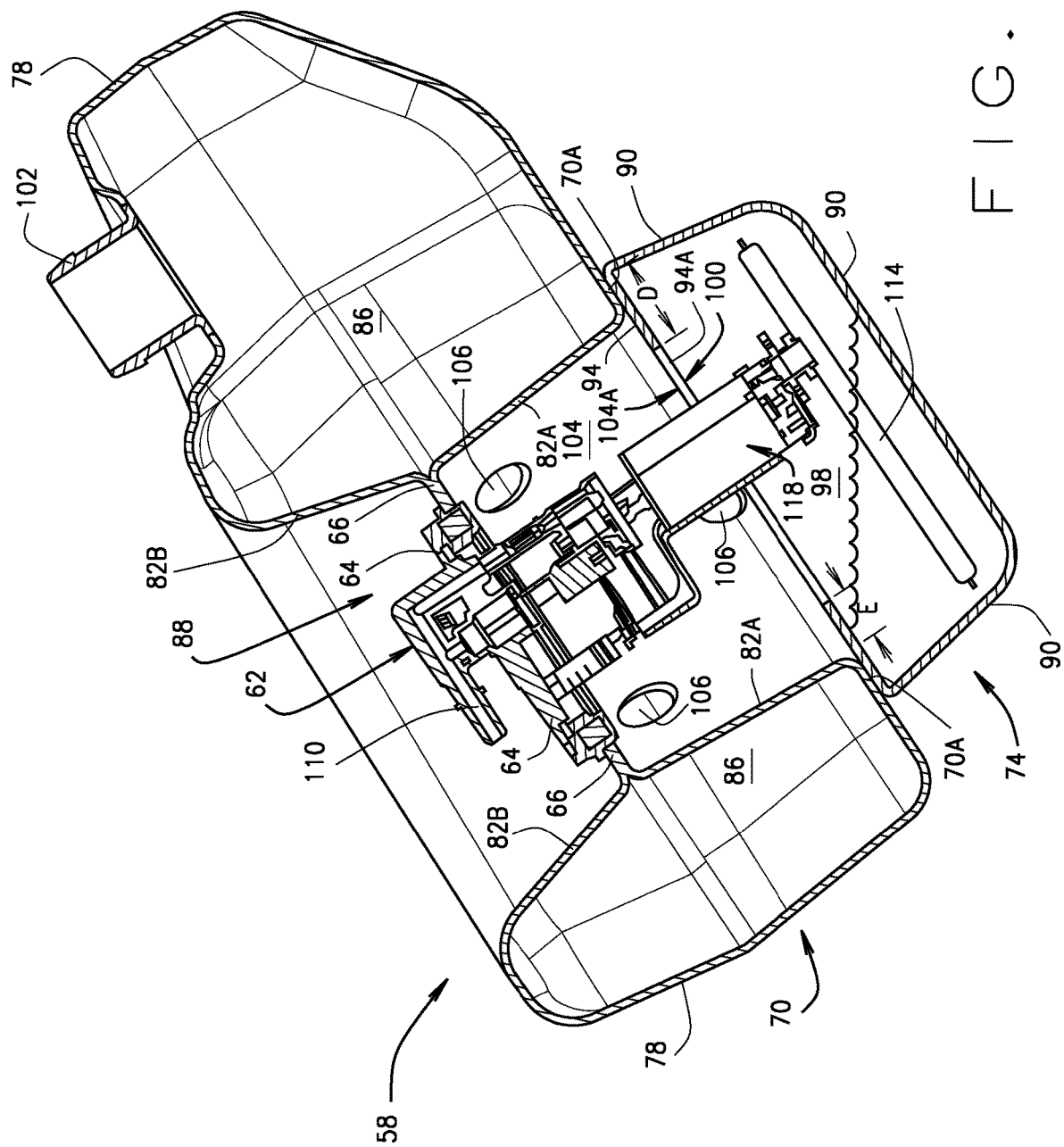

FIG. 7 is an exemplary illustration of the dual reservoir fuel tank system shown in FIGS. 1A, 1B, 2A, 2B, 3 and 4 disposed at an angle exemplarily illustrating how fuel is retained within an auxiliary reservoir of the duel reservoir fuel tank when the vehicle is disposed on inclined terrain and/or when the vehicle is making a fast or long sweeping turn so that the fuel remains accessible a fuel pump of the dual reservoir fuel tank system in accordance with the various embodiments of the present disclosure.

Figure 8:
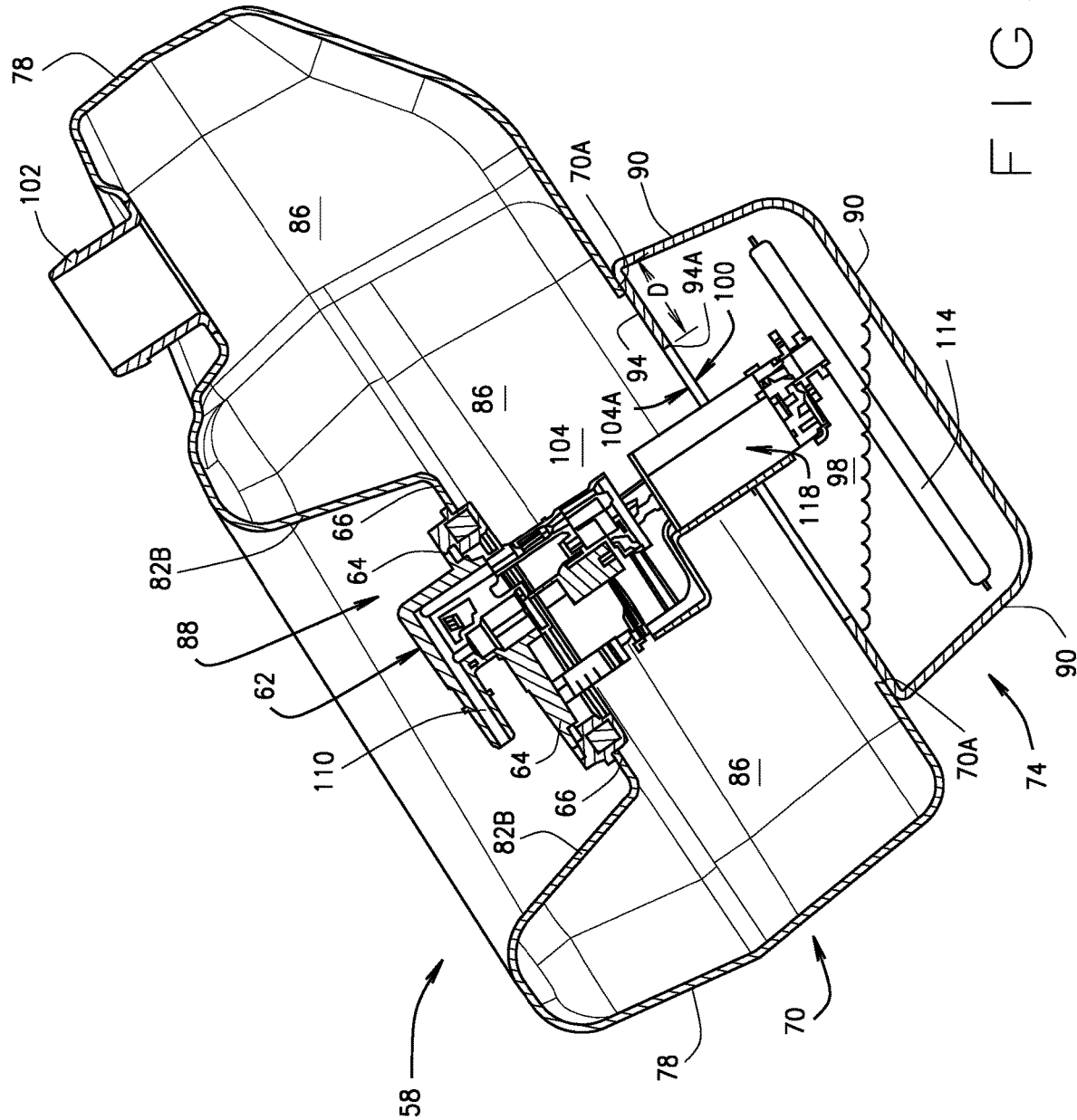

FIG. 8 is an exemplary illustration of the dual reservoir fuel tank system shown in FIG. 8, absent a lower portion of an inner wall of a main fuel reservoir, wherein the dual reservoir fuel tank system is disposed at an angle exemplarily illustrating how fuel is retained within an auxiliary reservoir of the duel reservoir fuel tank when the vehicle is disposed on inclined terrain and/or when the vehicle is making a fast or long sweeping turn so that the fuel remains accessible a fuel pump of the dual reservoir fuel tank system in accordance with the various embodiments of the present disclosure.

Figure 9:
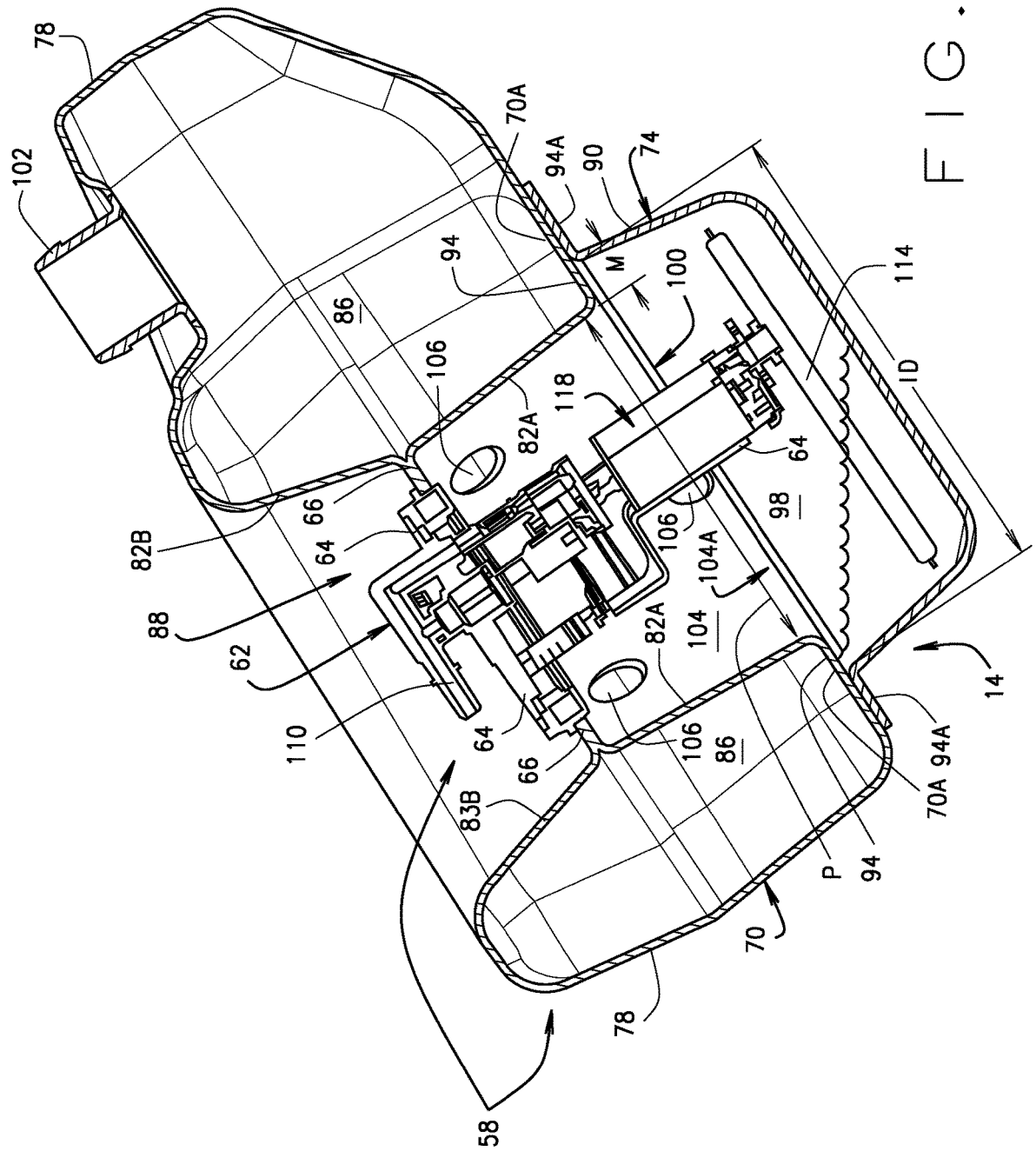

FIG. 9 is a cross-sectional view of the dual reservoir fuel tank system shown in FIGS. 1A through 8 in accordance with the various alternative embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring to FIGS. 1A, 1B, 2A and 2B, in various embodiments the present disclosure provides a vehicle 10 that comprises a dual reservoir fuel tank 14 that is structured and operable to provide fuel to a vehicle engine 18 when the vehicle 10 is disposed on an incline or slope (e.g., terrain that is at angle of 25° to 75° from horizontal) in any direction and/or when the vehicle 10 is making fast or long sweeping turns. The vehicle 10 can be any vehicle that utilizes a liquid fuel operated engine (e.g., a gasoline internal combustion engine) to provide motive force to propel the vehicle 10 across the terrain on which the vehicle 10 is disposed. For example, the vehicle 10 can be any power sport vehicle, off-road vehicle and other lightweight vehicles including, but limited to, snowmobiles, watercraft, all-terrain vehicles (ATVs), utility task vehicles (UTVs), recreational off-highway vehicles (ROVs), side-by-side vehicles (SSV), worksite vehicles, buggies, motorcycles, tactical vehicles, golf cars, personal transport vehicles, etc., that includes a liquid fuel powered engine, i.e., and engine that operates utilizing a liquid fuel. The vehicle 10 generally includes the engine 18 (e.g., an internal combustion engine) that is mounted a chassis or frame 22, a drivetrain 26 that is operably connected to the engine 18 and to a vehicle propulsion system 30, and a vehicle steering system 34. The engine 18 produces torque (e.g., motive force, e.g., power) that is delivered to the propulsion system 30, via the drivetrain 26, whereby the propulsion system 30 utilizes the torque from the engine 18 to generate motive force to propel the vehicle 10 across the terrain on which the vehicle 10 is disposed. The vehicle steering system 34 is controllable by a vehicle operator, and is structured and operable to guide the direction in which the vehicle 10 travels.

The vehicle propulsion system 30 can be any system that is structured and operable to utilize the torque delivered by the engine 18 to generate motive force that will propel the vehicle 10 across the terrain on which the vehicle 10 is disposed. For example, in various embodiments, as exemplarily illustrated in FIGS. 1A and 2A, the vehicle propulsion system 30 can comprise one or more drive wheel 38 that is operably connected to the drivetrain 26. Or, in various other embodiments, as exemplarily illustrated in FIGS. 1B and 2B, the vehicle propulsion system 30 can comprise one or more drive track 42 that is operably connected to the drivetrain 26. The vehicle steering system 34 can be any system that is structured and operable to guide, or control, the direction in which the vehicle 10 travels the terrain on which the vehicle 10 is disposed. For example, in various embodiments, as exemplarily illustrated in FIGS. 1A and 2A, the vehicle steering system 34 can comprise one or more guide wheel 46 that is operably connected to an operator steering control 50 (e.g., a steering wheel). Or, in various other embodiments, as exemplarily illustrated in FIGS. 1B and 2B, the vehicle steering system 34 can comprise one or more steering ski or blade 54 that is operably connected to an operator steering control 50 (e.g., a steering handlebar).

Referring now to FIGS. 1A through 6, as described above, the engine 18 is a liquid fuel engine (e.g., and internal combustion engine) that utilized the liquid fuel (e.g., combusts an air/fuel mixture within one or more cylinders) to produce motive torque delivered to the drivetrain 26, as described above. The fuel can be any liquid fuel such as gasoline, diesel fuel, or any another liquid fuel that can be utilized by the engine 18 to produce the motive torque. The dual reservoir fuel tank 14 stores, or retains, the fuel that is utilized by engine 18. More specifically, the vehicle 10 comprises a dual reservoir tank fuel system 58 that comprised the dual reservoir fuel tank 14 and a fuel pump 62 that is structured and operable to pump the fuel from within the dual reservoir fuel tank 14 to the engine 18. In various embodiments, the fuel pump 62 comprises a fuel outlet 110, a fuel uptake sock 114, and an outer body 64 that houses a fuel pumping mechanism 118.

Figure 1A:
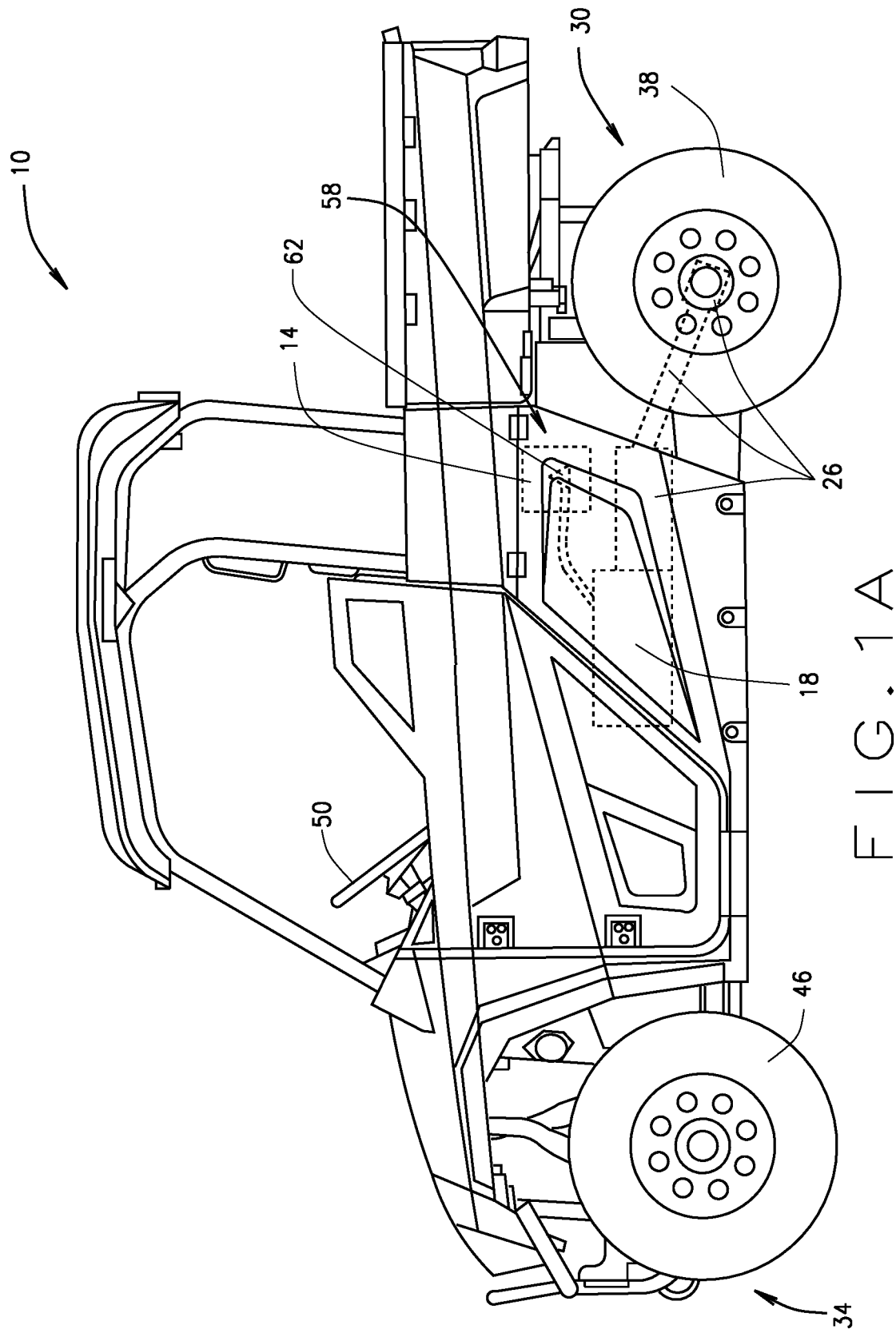
FIG. 1A is an illustration of a vehicle comprising a dual reservoir fuel tank system in accordance with various embodiments of the present disclosure, wherein the vehicle is exemplarily illustrated as a four-wheeled all terrain vehicle.
Figure 1B:
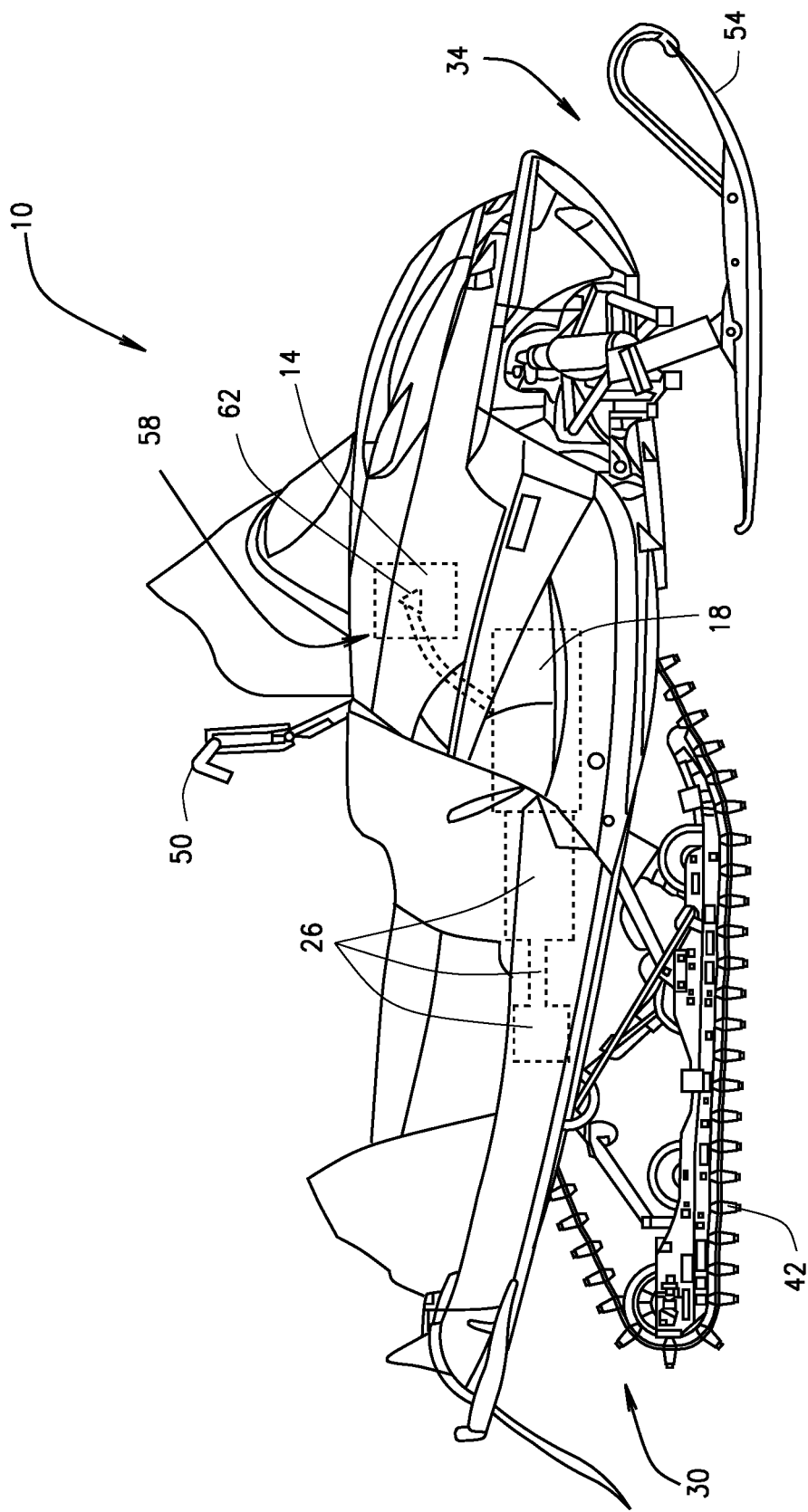
FIG. 1B is a schematic of a chassis, drivetrain and the dual reservoir fuel tank system of the vehicle shown in FIG. 1B, in accordance with various embodiments of the present disclosure.
Figure 2A:
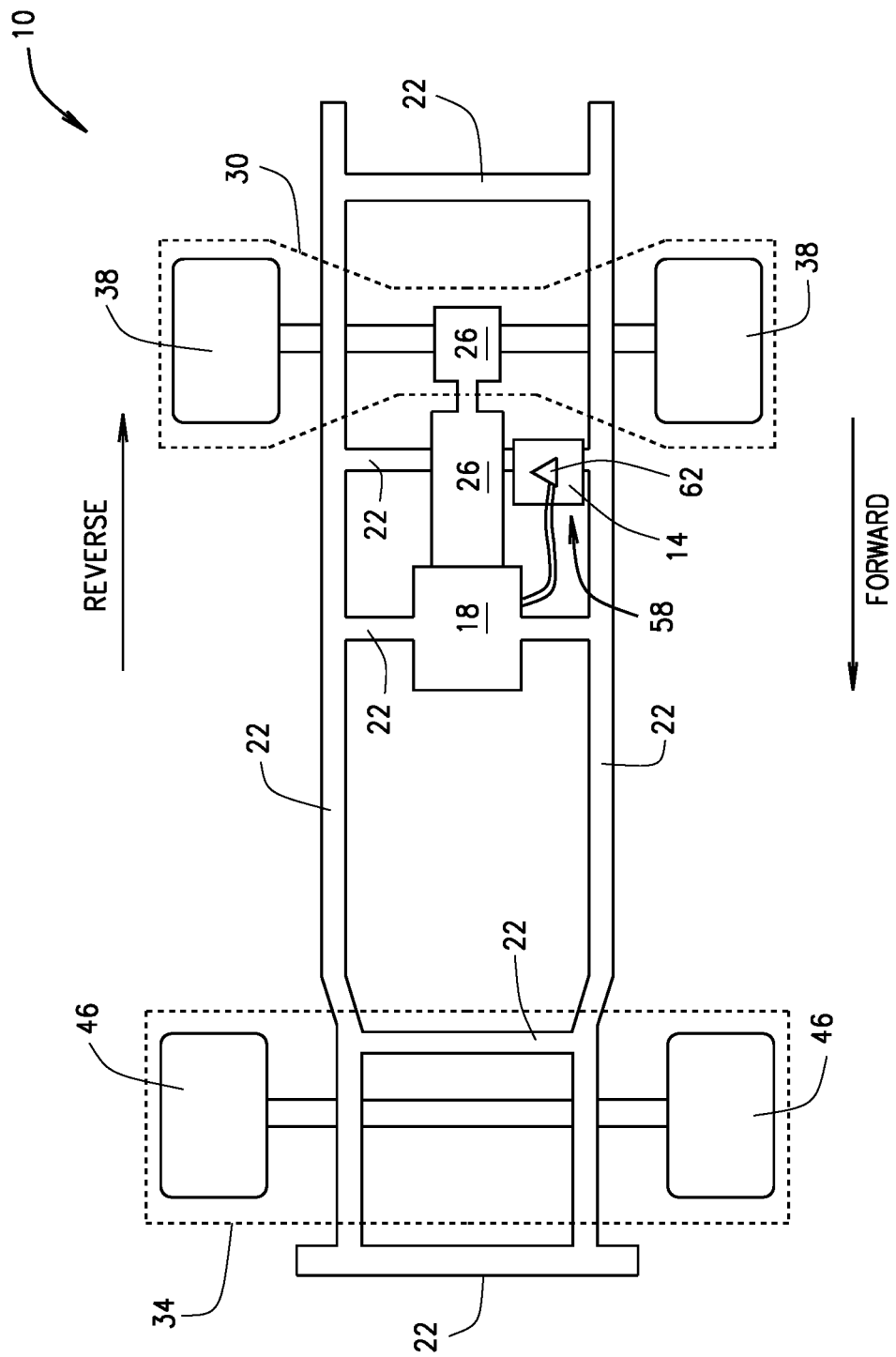
FIG. 2A is an illustration of a vehicle comprising the dual reservoir fuel tank system in accordance with various embodiments the present disclosure, wherein the vehicle is exemplarily illustrated as a snowmobile.
Figure 2B:
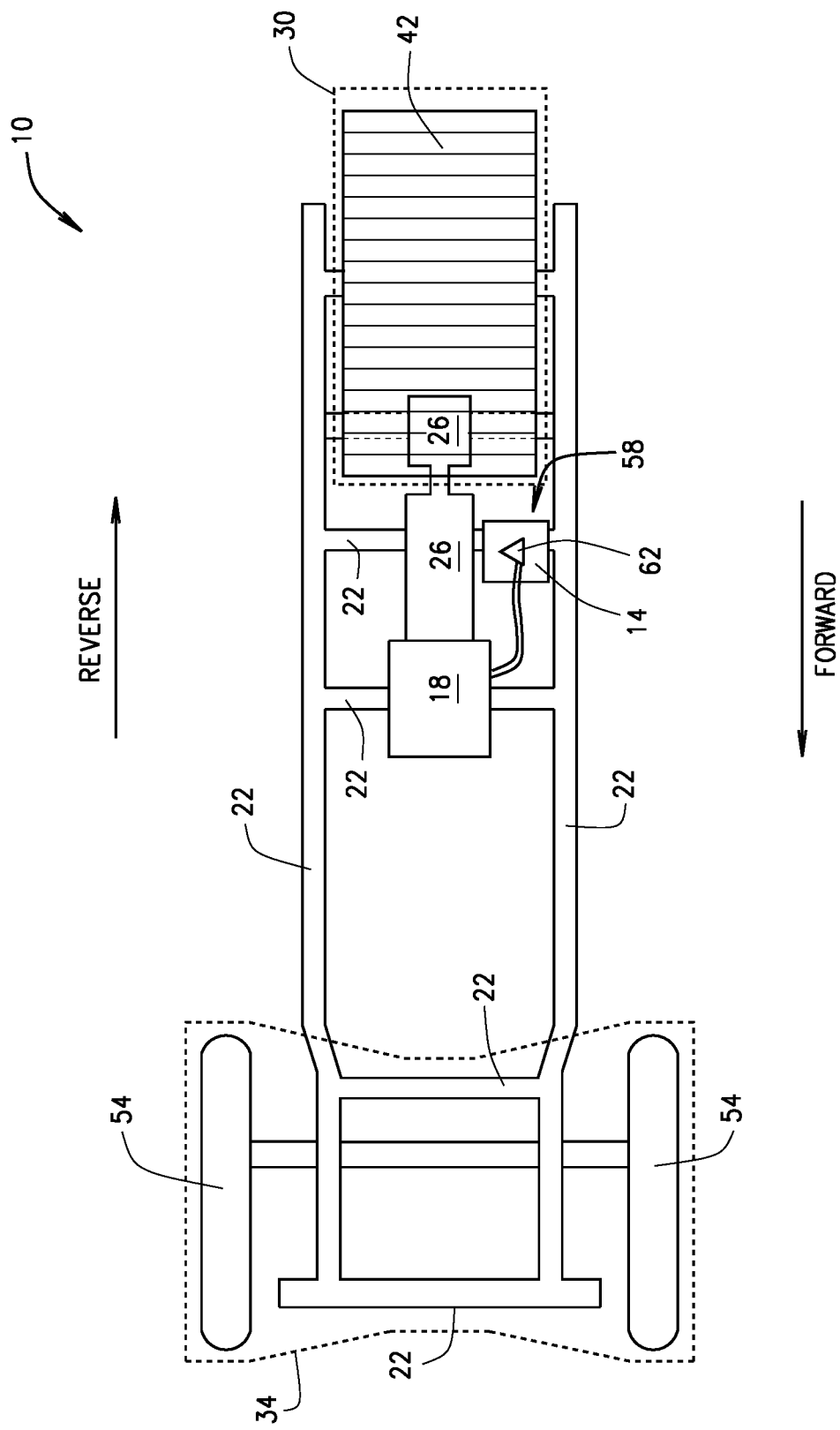
FIG. 2B is a schematic of a chassis, drivetrain and the dual reservoir fuel tank system of the vehicle shown in FIG. 2B, in accordance with various embodiments of the present disclosure.
Figure 3:
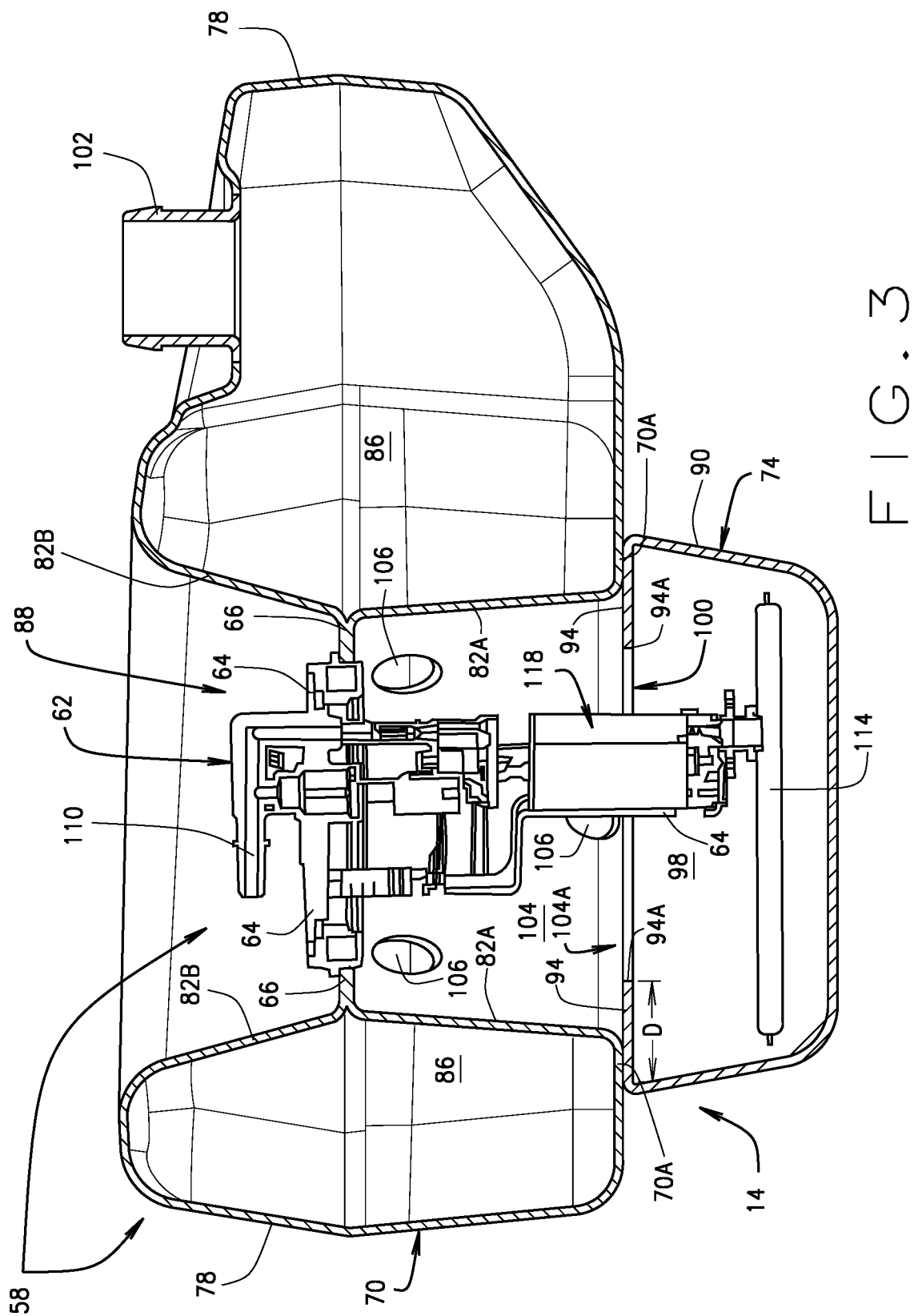
FIG. 3 is a cross-sectional view of the dual reservoir fuel tank system shown in FIGS. 1A, 1B, 2A and 2B comprising a dual reservoir fuel tank in accordance with the various embodiments of the present disclosure.
Figure 4:
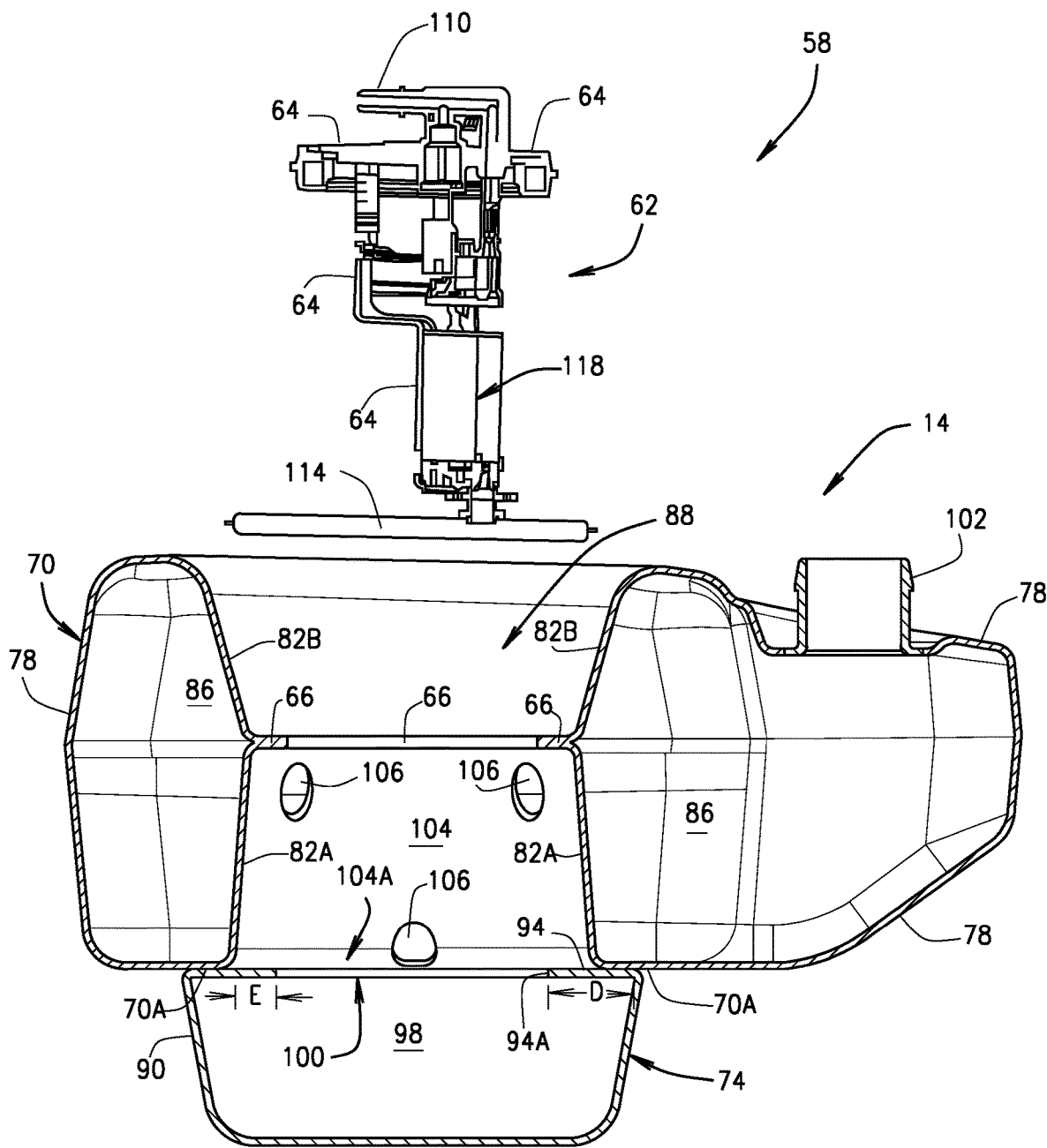
FIG. 4 is an exploded cross-sectional view of the dual reservoir fuel tank system shown in FIGS. 1A, 1B, 2A, 2B and 3 in accordance with the various embodiments of the present disclosure.
Figure 5:
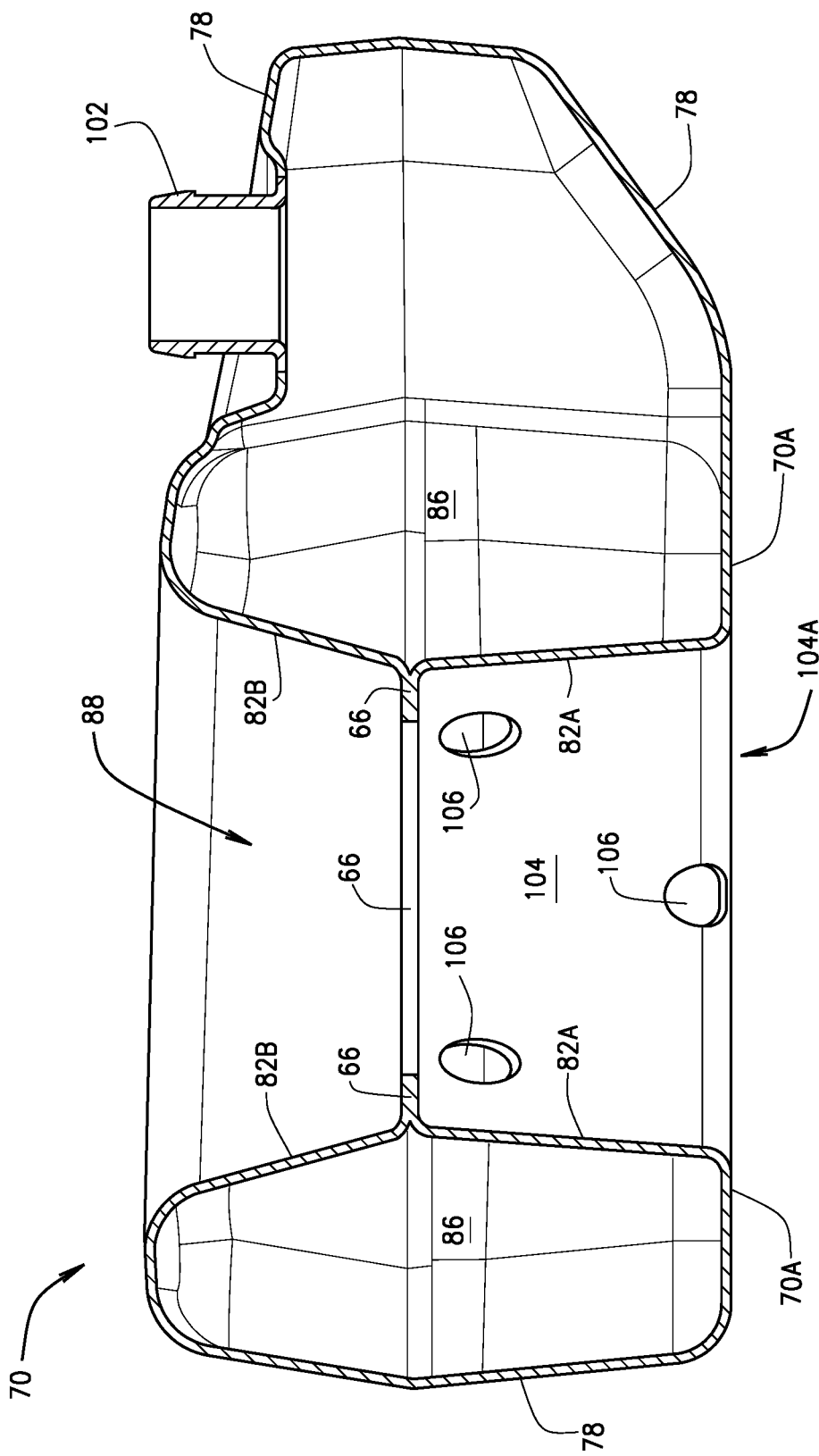
FIG. 5 is a cross-sectional view of a main fuel reservoir of the dual reservoir tank shown in FIG. 4, in accordance with various embodiments of the present disclosure.
Figure 6:
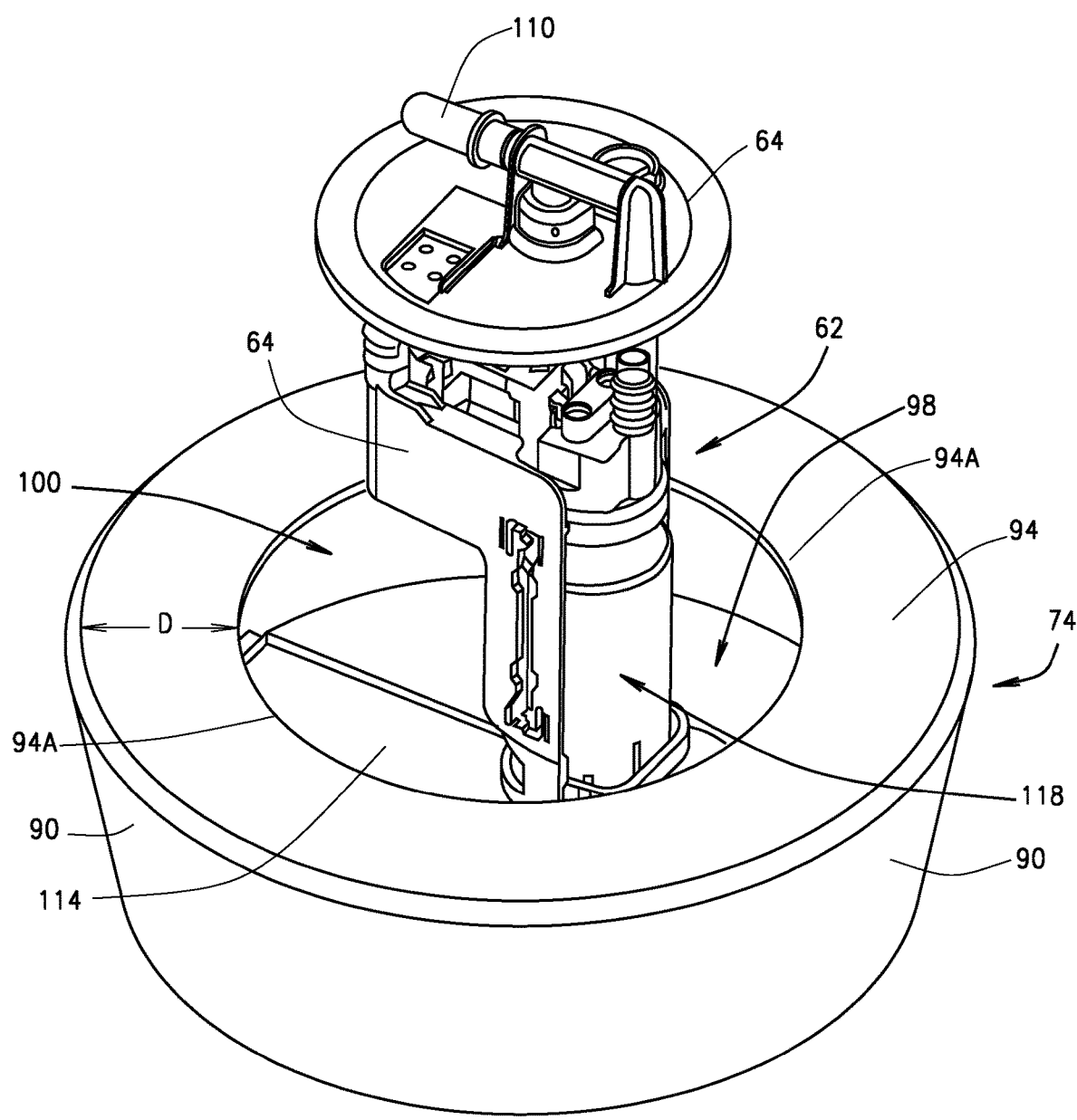
FIG. 6 is an isometric view of an auxiliary fuel reservoir of the dual reservoir tank shown in FIG. 4, in accordance with various embodiments of the present disclosure.

As exemplarily illustrated in detail in FIGS. 3, 4 and 5 and described above, in various embodiments the dual reservoir fuel tank system 58 comprises the dual reservoir fuel tank 14 and the fuel pump 62. The dual reservoir fuel tank 14 generally comprises a main fuel reservoir 70 and an auxiliary fuel reservoir 74 that is connected, mounted, adhered or attached to a bottom 70A of the main fuel reservoir 70. In various embodiments, the main fuel reservoir 70 and an auxiliary fuel reservoir 74 are fabricated or constructed separately and subsequently connected, mounted, adhered or attached to each other to provide the dual reservoir fuel tank 14.

The main fuel reservoir 70 comprises an outer wall 78 and an inner wall 82 that define a main reservoir chamber 86. In various embodiments, the main fuel reservoir 70 is structured and shaped to generally have a ring shape such that the inner wall 82 defines an open center space 88 in which the fuel pump 62 is disposed. As used herein term 'ring' and 'ring-shaped' will be understood to mean any body or structure generally having a continuous enclosing outer body that defines and open space surrounded by the outer body. The main fuel reservoir 70 and center space 88 can have generally any size or/or shape that forms a ring-shaped main fuel reservoir 70, for example, a round ring, a square ring, a triangular ring, an oval ring, a hexagonal ring, etc., and remain within the scope of the present disclosure. More particularly, the dual reservoir fuel tank can be fabricated or constructed to have any desired size and shape and can vary from vehicle to vehicle to maximize the fuel volume to fit within the structure of the respective vehicle. The auxiliary fuel reservoir 74 comprises a bowl-shaped outer wall 90 and a lip extending inward from a top end of the outer wall 90. In various embodiments, the lip is referred to herein as a fuel retention lip 94 having a length D and extending inward from the top end of the outer wall 90. The outer wall 90 and a fuel retention lip 94 define an auxiliary reservoir chamber 98 in which fuel can be retained and stored for access by the fuel pump 62, as described below. A distal edge 94A of the fuel retention lip defines a mouth (e.g., an opening) 100 of the auxiliary reservoir chamber 98. As used herein the term 'bowl-shaped' will be understood to mean that the auxiliary fuel reservoir outer wall 90 can have any desired shape generally having a sidewall and a bottom that define the auxiliary reservoir chamber 98 (e.g., a bowl) in which fuel can be retained and stored for access by the fuel pump 62. For example, the auxiliary fuel reservoir outer wall 90 can have a generally cylindrical shape, a generally cubical shape, a generally hemispherical shape, a generally hexagonal shape, etc. The dual reservoir fuel tank 14 additionally includes a fuel tank inlet 102 that is fluidly connected with the main reservoir chamber 86 such that fuel can be dispensed into the dual reservoir fuel tank 14, particularly into the main reservoir chamber 86, via the fuel tank inlet 102.

As described above, in various embodiments, in various embodiments, the main fuel reservoir 70 and an auxiliary fuel reservoir 74 are fabricated or constructed separately and subsequently connected, mounted, adhered or attached to each other to provide the dual reservoir fuel tank 14. The auxiliary fuel reservoir 74 can be connected, mounted, adhered or attached to the bottom 70A of the main reservoir 70 using any desired connection, mounting, adhering or attaching means or method. For example, in various embodiments, the auxiliary fuel reservoir can be fabricated separately from the main reservoir 70 and attached to the main reservoir bottom 70A via spin or inertia welding, ultrasonic welding or any other suitable means or method, e.g., gluing, riveting, using screws or bolts, threaded engagement, etc. For example, in various such instances, a molded ring can be formed on the main fuel reservoir bottom 70A to which the auxiliary fuel reservoir 74 is connected via rivets, screws, bolts, or welding. As a further example, as described above, in various instances the auxiliary fuel reservoir 74 can be welded (e.g., spin or inertia welding) to the main fuel reservoir 70. In various embodiments of such instances, an additional rib would be molded on the auxiliary fuel reservoir retention lip 94, or the main fuel reservoir bottom 70A that would be melted during the welding process to form the welded joint. In various instances, such a rib would be continuous and there could be more than one rib to better guarantee the seal. Additionally, such a rib or ribs would prevent the fuel reservoir retention lip 94 from thinning out in the region of the weld.

As described above, the fuel pump 62 is disposed within the main fuel reservoir center space 88. More particularly, the outer body 64 of the fuel pump 62 is mountable to the main fuel reservoir inner wall 82 in a leak-proof manner such that fuel cannot pass between the fuel pump outer body 64 and the main fuel reservoir inner wall 82. The fuel pump can be leak-proof mounted to the main fuel reservoir inner wall 82 in any suitable manner. For example, in various embodiments, the main fuel reservoir inner wall 82 comprises a mounting boss 66 to which the fuel pump outer body 64 can be leak-proof mounted via a gasket and threaded connection to form a leak-proof seal therebetween, via bolts, screws or riveted with a gasket to form a leak-proof seal therebetween, via sonic welding to form a leak-proof seal therebetween, etc. In various embodiments, the inner wall 82 comprises a lower portion 82A and an upper portion 82B and a fuel pump mounting boss 66 formed at the junction (e.g., region of transition) of the inner wall upper and lower portions 82B and 82A. Furthermore, when the fuel pump 62 is leak-proof mounted to the mounting boss 66, the lower portion 82A of the main fuel reservoir inner wall 82, the fuel pump outer body 64, and the auxiliary fuel reservoir retention lip 94 define an interstitial chamber 104 formed between the auxiliary fuel reservoir retention lip 94 and the mounting boss 66. The interstitial chamber 104 has an open bottom 104A, whereby the interstitial chamber 104 is fluidly connected with the auxiliary reservoir chamber 98, via the auxiliary reservoir chamber mouth 100. As described above, the fuel retention lip 94 has a length D. Moreover, the auxiliary fuel reservoir 90 is designed, shaped and sized, such that the retention lip 94 has the length D, whereby the retention lip 94 extends inward into the interstitial chamber open bottom 104A a distance E beyond where the inner wall lower portion 82A joins or connects to the retention lip 94. As described further below, the retention lip 94 having the length D and extending into interstitial chamber open bottom 104A the distance E is structured and operable to retain fuel within the auxiliary reservoir chamber 98, such that the fuel is accessible to the fuel sock 114 when the vehicle 10 is disposed on inclined terrain and/or when the vehicle is making a fast or long sweeping turn. Moreover, the retention lip length D and distance E can have any desired length/distance, whereby the amount of fuel retained within the auxiliary reservoir chamber 98 when the dual reservoir fuel tank is disposed at an angle can be predetermined and controlled.

Still further, in such embodiments, the main fuel reservoir inner wall lower portion 82A includes one or more fuel ports 106 extending therethrough that fluidly connect the main reservoir chamber 86 with the interstitial chamber 104. Hence, the main reservoir chamber 86 is fluidly connected to the auxiliary reservoir chamber 98 via the main fuel reservoir inner wall lower portion ports 106, the interstitial chamber open bottom 104A, and the auxiliary reservoir chamber mouth 100. Accordingly, fuel can be dispensed into the main reservoir chamber 86, via the fuel tank inlet 102, whereafter the fuel will flow through the main fuel reservoir inner wall lower portion ports 106 and into the auxiliary reservoir chamber 98, thereby filling the auxiliary reservoir chamber 98, the interstitial chamber 104 and the main reservoir chamber 86.

Referring now to FIGS. 3, 4, 6 and 7, as described above, the fuel pump 62 generally comprises the outer body 64 and the fuel uptake sock 114 and is mountable to the mounting boss 66. More particularly, when the fuel pump 62 is mounted to the mounting boss 66 an upper portion of the fuel pump body 64 extends into the center space 88 of the main fuel reservoir 70, a lower portion that extends through the interstitial chamber 104 and into the auxiliary reservoir chamber 98, and the fuel uptake sock 114 that is mounted to a distal end of the fuel pump lower portion is disposed in the auxiliary reservoir chamber 98. In various instances the fuel pump 62 is sized such that the fuel uptake sock 114 is disposed in a lower half of the auxiliary reservoir chamber 98. For example, in various embodiments, the uptake sock 114 is disposed in a lower quarter of the auxiliary reservoir chamber 98, e.g., near the bottom of the auxiliary reservoir chamber 98, e.g., within ⅛ of an inch from the bottom of the auxiliary reservoir chamber 98. Or, in various other embodiments, the fuel pump 62 is sized such that the fuel uptake sock 114 is disposed at least partially in contact with the bottom of the auxiliary reservoir chamber 98.

Particularly, the fuel pump 62 is connectable to the main fuel reservoir inner wall 82 such that the fuel uptake sock 114 is disposed within the auxiliary reservoir chamber 98 such that the fuel within the auxiliary reservoir chamber 98 is accessible to the fuel uptake sock 114 and the fuel outlet 110 is accessible to and connectable to a fuel hose (not shown) that connects to a fuel intake of the engine 18 (not shown). The fuel pump 62, particularly the fuel pumping mechanism 118, is structured and operable to suck, draw or uptake fuel from within auxiliary reservoir chamber 98 and pump the fuel out the fuel pump fuel outlet 110 to the engine 18, whereafter the engine utilizes the fuel to produce motive torque as described above. The auxiliary fuel reservoir 74, particularly the auxiliary fuel reservoir outer wall 90, can be any desired shape and size designed to provide any desired internal volume of the auxiliary reservoir chamber 98. Similarly, the fuel pump can be designed to have any dimensions designed to dispose, locate, orient, and position the fuel pump uptake sock 114 at any desired location and any desired orientation and position within the auxiliary reservoir chamber 98 to efficiently draw fuel from within the auxiliary reservoir chamber 98. Still further, the fuel pump uptake sock 114 can have any desired shape, size and geometry designed to efficiently draw fuel from within the auxiliary reservoir chamber 98.

Referring now to FIG. 8, in various embodiments, it is envisioned that the main fuel reservoir inner wall 82 can be structured such that the inner wall 82 is absent the lower portion 82A. In such embodiments, the dual reservoir fuel tank 14 is absent the interstitial chamber 104 shown in FIG. 7, and the internal volume of the main reservoir chamber 86 is expanded to include the entire space and volume between opposing sides of the main fuel reservoir outer wall 78 and below the fuel pump mounting 66 of the boss main fuel reservoir inner wall 82.

Referring now to FIGS. 7 and 8, as described above, the dual reservoir fuel tank 14 of the present disclosure is structured and operable to provide fuel to the vehicle engine 18 when the vehicle 10 is disposed on an incline or slope in any direction and/or when the vehicle 10 is making fast or long sweeping turns. More particularly, the dual reservoir fuel tank 14 is structured and operable to retain fuel within the auxiliary reservoir chamber 98 such that the fuel is accessible to the fuel pickup sock 114 when there is a low amount of fuel remaining in the dual reservoir fuel tank 14 (e.g., when the level of fuel is such that when the vehicle 10 is on level ground fuel only remains within the auxiliary fuel chamber 98) and the vehicle 10 is disposed on an incline or slope and/or when the vehicle 10 is making fast or long sweeping turn.

As exemplarily illustrated in FIGS. 7 and 8 when the vehicle 10 is disposed on an incline or slope and/or when the vehicle 10 is making fast or long sweeping turn fuel within the auxiliary reservoir chamber 98 will be forced in one direction toward the outer wall 90 due to gravitational and/or centrifugal force. In known fuel tanks, this would cause at least a portion of the fuel to be forced away from, and become inaccessible to, the respective fuel pump uptake sock. However, under such conditions or circumstances, at least a portion of, and in various instances all of, the fuel within the auxiliary reservoir chamber 98 will be retained therein by the retention lip 94 and remain accessible to the fuel pump uptake sock 114 due to the retention lip 94. That is, the gravitational and/or centrifugal forces will try to force the fuel to flow out of the auxiliary reservoir chamber 98 and into the main reservoir chamber 86 and/or the interstitial chamber 104 such that the fuel would be inaccessible to the fuel pump intake sock 114 and not able to be pumped to, and not able to be utilized by, the engine 18. However, the retention lip 94 will block at least a portion of the fuel from flowing into the main reservoir chamber 86 and/or the interstitial chamber 104, thereby retaining the fuel within the auxiliary reservoir chamber 98 such that the fuel remains accessible to the fuel pump intake sock 114 and able to be pumped to, and utilized by, the engine 18.

As described above, the retention lip 94 has a length D (e.g., 1 inch to 3 inches) and extends inward into the interstitial chamber open bottom 104A a distance E (e.g., ½ inch to 2½ inches) beyond where the inner wall lower portion 82A joins or connects to the retention lip 94. As will be easily understood by one skilled in the art, the length D of the retention lip 94, particularly the distance E, will determine or control how much fuel is retained within the auxiliary reservoir chamber 98 and remain accessible to the fuel pump sock 114. Accordingly, the auxiliary reservoir 74 can be fabricated or constructed such that the retention lip 94 can have any particular predetermined or desired length D, and hence any particular predetermined or desired distance E, to retain a specific desired quantity of fuel within the auxiliary chamber 98 when the vehicle 10, particularly the dual reservoir fuel tank 14, is disposed at an angle or undergoing a fast or sweeping turn. Additionally, the length D of the retention lip 94 and the distance E can be determined based on the size and shape of the fuel pump sock 114, and/or the speed limitations of the respective vehicle 10, and/or the expected use of the respective vehicle 10, and/or the expected terrain on which the respective vehicle 10 is intended be used, and/or the expected frequency and duration of time the respective vehicle 10 is expected to be traversing inclined or sloped terrain or making fast or long sweeping turns.

Referring now to FIG. 9, it is envisioned that in various embodiments, the auxiliary fuel reservoir 74 can be fabricated such that the of the auxiliary fuel reservoir extends outward away from the interior of the auxiliary fuel reservoir 74, i.e., away from the auxiliary reservoir chamber 98 and provides a mounting lip 94A for mounting the auxiliary fuel reservoir the bottom of the main fuel reservoir 70. In such instances, the auxiliary fuel reservoir 74 would be sized such that outer wall 90 has an inside diameter ID that is larger than an interior diameter P of the main fuel reservoir bottom 70A. For example, in the embodiments with the interstitial chamber 104, auxiliary fuel reservoir 74 would be sized such that auxiliary fuel reservoir outer wall 90 has an inside diameter ID that is larger than an interior diameter of the point where the lower portion 82A main fuel reservoir inner wall 82 joins the main fuel reservoir bottom 70A.

In such embodiments, wherein the auxiliary fuel reservoir 74 includes the mounting lip 94A and the inside diameter ID that is larger than an interior diameter P of the main fuel reservoir bottom 70A, the portion of the main fuel reservoir bottom 70A will be disposed inward from the top edge of the auxiliary fuel reservoir outer wall 90 and extend into the auxiliary reservoir chamber 98 and will provide and function as the fuel retention lip 94. Furthermore, the portion of the fuel reservoir bottom 70A that extends into the auxiliary fuel reservoir chamber 98 (i.e., the fuel retention lip 94) will retain fuel within the auxiliary reservoir chamber 98 and accessible to the fuel pump sock 114 as described above with regard to the embodiments wherein the fuel retention lip 94 comprises in inward extending lip of the auxiliary fuel reservoir 74. That is, when the vehicle 10 is disposed on an incline or slope and/or when the vehicle 10 is making fast or long sweeping turn fuel within the auxiliary reservoir chamber 98 will be forced in one direction toward the outer wall 90 due to gravitational and/or centrifugal force. Under such conditions or circumstances, at least a portion of, and in various instances all of, the fuel within the auxiliary reservoir chamber 98 will be retained therein by the bottom 70A of the main fuel reservoir 70 (i.e., the fuel retention lip 94) and remain accessible to the fuel pump uptake sock 114 due to the retention lip 94. That is, the gravitational and/or centrifugal forces will try to force the fuel to flow out of the auxiliary reservoir chamber 98 and into the main reservoir chamber 86 and/or the interstitial chamber 104 such that the fuel would be inaccessible to the fuel pump intake sock 114 and not able to be pumped to, and not able to be utilized by, the engine 18. However, the bottom 70A of the main fuel reservoir 70 (i.e., the fuel retention lip 94) will block at least a portion of the fuel from flowing into the main reservoir chamber 86 and/or the interstitial chamber 104, thereby retaining the fuel within the auxiliary reservoir chamber 98 such that the fuel remains accessible to the fuel pump intake sock 114 and able to be pumped to, and utilized by, the engine 18.

Moreover, the fuel retention lip 94 (i.e., bottom 70A of the main fuel reservoir 70) will have a length M. More particularly, the auxiliary fuel reservoir 90 is designed, shaped and sized, such that the retention lip 94 (i.e., bottom 70A of the main fuel reservoir 70) has the length M. As described above with regard to the embodiments wherein the retention lip 94, the length M is structured and operable to retain fuel within the auxiliary reservoir chamber 98, such that the fuel is accessible to the fuel sock 114 when the vehicle 10 is disposed on inclined terrain and/or when the vehicle is making a fast or long sweeping turn. Furthermore, the retention lip length M can have any desired length whereby the amount of fuel retained within the auxiliary reservoir chamber 98 when the dual reservoir fuel tank is disposed at an angle can be predetermined and controlled.

Referring now to FIGS. 3, 4, 5, and 7, as described above, in various embodiments, the main fuel reservoir inner wall lower portion 82A includes one or more ports 106 extending therethrough that fluidly connect the main reservoir chamber 86 with the interstitial chamber 104 and the auxiliary reservoir chamber 98. In various embodiments, the lower port holes 106 can be strategically placed around the inner wall lower portion 82A such that a greater amount of fuel is retained within the interstitial chamber 104 and does not flow into the main reservoir chamber 86 when the vehicle 10 (and dual reservoir fuel tank 14) are disposed on an incline or slope and/or when the vehicle 10 is making fast or long sweeping turn, thereby maintaining a greater amount of fuel within the interstitial chamber and available for access by the fuel pump uptake sock 114. That is, the ports 106 can be located at various locations along the inner wall lower portion 82A and/or at various heights above the auxiliary fuel reservoir retention lip 94 such that when the fuel within the auxiliary reservoir chamber 98 and/or the interstitial chamber are forced, via gravitational or centrifugal force, to one particular side or portion of the inner wall lower portion 82A there is no port 106 disposed in that particular side or portion of the inner wall lower portion 82A. Hence, in such circumstances the fuel cannot flow from the interstitial chamber 104 into the main reservoir chamber 86 when forced to the particular side or portion of the inner wall lower portion 82A, and therefore, the fuel remains available to flow into the auxiliary chamber 98 and be accessible to the fuel pump sock 114 should the vehicle remain disposed at an angle or executing a sweeping turn for an extended period of time.

For example, if a particular vehicle 10 known on intended to be used to travel up and/or down long inclines or slopes (e.g., a snowmobile used to ascend large mountains) the dual reservoir fuel tank 14 can be constructed such that the portion of inner wall lower portion 82A that will be oriented toward the rear and/or front of the vehicle 10 may be absent ports 106 or may have the ports 106 disposed at height above the retention lip 94, e.g., closer to the fuel pump mounting boss 66 than to the retention lip 94.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A dual reservoir fuel tank, said fuel tank comprising:
   a main fuel reservoir comprising an inner wall and an outer wall that define a main reservoir chamber; and
   an auxiliary fuel reservoir connected to a bottom of the main fuel reservoir, the auxiliary fuel reservoir comprises an outer wall that defines an auxiliary reservoir chamber; and
   a fuel retention lip, wherein the fuel retention lip is structured and operable to retain fuel within the auxiliary reservoir chamber when the dual reservoir fuel tank is disposed at an angle.

2. The tank of claim 1, wherein the fuel retention lip has a predetermined length structured and operable to control an amount of fuel retained within the auxiliary reservoir chamber when the dual reservoir fuel tank is disposed at an angle.

3. The tank of claim 1, wherein inner wall comprises an upper portion, a lower portion, and a mounting boss formed therebetween.

4. The tank of claim 3 further comprising an interstitial chamber formed between the fuel pump mounting boss, the inner wall lower portion, and the auxiliary fuel reservoir.

5. The tank of claim 4, wherein the inner wall lower portion comprises one or more fuel ports extending therethrough.

6. The tank of claim 5, wherein the fuel retention lip extends from a top of an outer wall of the auxiliary fuel reservoir and extends inward into an open bottom of the interstitial chamber a predetermined distance beyond where the inner wall lower portion joins to the retention lip.

7. The tank of claim 5, wherein the fuel retention lip comprises a portion of a bottom of the main fuel reservoir that is disposed inward from a top of an outer wall of the auxiliary fuel reservoir.

8. A dual reservoir fuel tank system, said system comprising:
   a dual reservoir fuel tank comprising:
      a main fuel reservoir comprising an inner wall and an outer wall that define a main reservoir chamber; and
      an auxiliary fuel reservoir connected to a bottom of the main fuel reservoir, the auxiliary fuel reservoir comprises an outer wall that defines an auxiliary reservoir chamber;
      a fuel retention lip; and
   a fuel pump mounted to the main fuel reservoir, the fuel pump comprising:
      an outer body;
      a fuel pumping mechanism disposed within the outer body; and
      a fuel uptake sock disposed within the auxiliary fuel reservoir,
   wherein the fuel retention lip is structured and operable to retain fuel within the auxiliary reservoir chamber and accessible to the fuel uptake sock when the dual reservoir fuel tank is disposed at an angle.

9. The system of claim 8, wherein the fuel retention lip has a predetermined length structured and operable to control an amount of fuel retained within the auxiliary reservoir chamber when the dual reservoir fuel tank is disposed at an angle.

10. The system of claim 8, wherein inner wall comprises an upper portion, a lower portion, and a mounting boss formed therebetween.

11. The system of claim 10 further comprising an interstitial chamber formed between the fuel pump mounting boss, the inner wall lower portion, and the auxiliary fuel reservoir.

12. The system of claim 11, wherein the inner wall lower portion comprises one or more fuel ports extending therethrough.

13. The system of claim 12, wherein the fuel retention lip extends from a top of an outer wall of the auxiliary fuel reservoir and extends inward into an open bottom of the interstitial chamber a predetermined distance beyond where the inner wall lower portion joins to the retention lip.

14. The system of claim 8, wherein the fuel retention lip comprises a portion of a bottom of the main fuel reservoir that is disposed inward from a top of an outer wall of the auxiliary fuel reservoir.

15. A vehicle, said vehicle comprising:
   a chassis;
   an engine that operates utilizing a liquid fuel, the engine mounted to the chassis;
   a drivetrain that is operably connected to the engine;
   a vehicle propulsion system that is operably connected to the drivetrain;
   a vehicle steering system structured and operable to guide a direction in which the vehicle travels; and
   a dual reservoir fuel tank comprising:
      a ring-shaped main fuel reservoir comprising an inner wall and an outer wall that define a main reservoir chamber, and an upper portion of the inner wall defines an open space in which a fuel pump is disposable; and
      an auxiliary fuel reservoir connected to a bottom of the main fuel reservoir, the auxiliary fuel reservoir comprises an outer wall that defines an auxiliary reservoir chamber; and a fuel retention lip, wherein the fuel retention lip is structured and operable to retain fuel within the auxiliary reservoir chamber when the dual reservoir fuel tank is disposed at an angle.

16. The tank of claim 15, wherein the fuel retention lip has a predetermined length structured and operable to control an amount of fuel retained within the auxiliary reservoir chamber when the dual reservoir fuel tank is disposed at an angle.

17. The tank of claim 15, wherein inner wall comprises an upper portion, a lower portion, and a mounting boss formed therebetween.

18. The tank of claim 17 further comprising an interstitial chamber formed between the fuel pump mounting boss, the inner wall lower portion, and the auxiliary fuel reservoir.

19. The tank of claim 18, wherein the inner wall lower portion comprises one or more fuel ports extending therethrough.

20. The tank of claim 19, wherein the fuel retention lip extends from a top of an outer wall of the auxiliary fuel reservoir and extends inward into an open bottom of the interstitial chamber a predetermined distance beyond where the inner wall lower portion joins to the retention lip.

\* \* \* \* \*